(12) United States Patent
Yang (10) Patent No.: US 9,066,162 B2
(45) Date of Patent: Jun. 23, 2015

(54) INDUSTRIAL CONTROLLER APPARATUS CAPABLE OF LOW ERROR, ULTRA HIGH-SPEED SERIAL COMMUNICATION AND METHOD FOR DRIVING SAME

(71) Applicant: HYUNDAI INFRACORE, INC., Seoul (KR)

(72) Inventor: Jong Seog Yang, Seoul (KR)

(73) Assignee: HYUNDAI INFRACORE, INC., Seoul (KR)

( * ) Notice: Subject to any disclaimer, the term of this patent is extended or adjusted under 35 U.S.C. 154(b) by 0 days.

(21) Appl. No.: 14/122,737

(22) PCT Filed: Mar. 29, 2013

(86) PCT No.: PCT/KR2013/002650
§ 371 (c)(1),
(2) Date: Nov. 27, 2013

(87) PCT Pub. No.: WO2013/157757
PCT Pub. Date: Oct. 24, 2013

(65) Prior Publication Data
US 2015/0030326 A1 Jan. 29, 2015

(30) Foreign Application Priority Data
Apr. 18, 2012 (KR) .......................... 10-2012-0040554

(51) Int. Cl.
| H04B 10/00 | (2013.01) |
| H04Q 11/00 | (2006.01) |
| H04L 12/12 | (2006.01) |
| G05B 19/418 | (2006.01) |
| H04B 10/27 | (2013.01) |

(52) U.S. Cl.
CPC ............ *H04Q 11/0062* (2013.01); *H04L 12/12* (2013.01); *Y02B 60/34* (2013.01); *G05B 19/418* (2013.01); *G05B 2219/31001* (2013.01); *H04B 10/27* (2013.01); *H04Q 11/0005* (2013.01)

(58) Field of Classification Search
CPC .......... H04Q 11/0001; H04Q 11/0005; H04Q 11/0062; H04Q 11/0066; H04Q 11/0088; H04Q 2011/0088; H04J 14/0228; H04J 14/0238; H04J 14/0241; H04B 10/27; H04B 10/25758; H04L 12/12; Y02B 60/34; G05B 19/418; G05B 2219/31001
USPC ............... 398/45, 58–60, 66, 67, 73–75, 106, 398/107, 109–113
See application file for complete search history.

(56) References Cited

U.S. PATENT DOCUMENTS

| 5,347,524 | A | * | 9/1994 | I'Anson et al. ................. 714/39 |
| 7,032,045 | B2 | * | 4/2006 | Kostadinov ................... 710/105 |
| 2009/0034455 | A1 | * | 2/2009 | Lee et al. ...................... 370/329 |

FOREIGN PATENT DOCUMENTS

| KR | 1020030005580 | 1/2003 |
| KR | 1020040006173 | 1/2004 |
| KR | 1020040057853 | 7/2004 |
| KR | 1020110085338 | 7/2011 |

* cited by examiner

*Primary Examiner* — Dalzid Singh
(74) *Attorney, Agent, or Firm* — Lexyoume IP Meister, PLLC (57) ABSTRACT

An industrial controller includes a control unit, a first optical transmission/reception unit, a second optical transmission/reception unit, and a switching unit. The control unit handles a downlink transmission frame depending on whether or not the Protocol Control Information (PCI) of the downlink transmission frame corresponds to an ID of an industrial controller device, and internally generates and outputs an uplink transmission frame. The first optical transmission/reception unit externally sends or receives the uplink or downlink transmission frame. The second optical transmission/reception unit has at least one port, and externally sends or receives the uplink or downlink transmission frame. The switching unit sequentially transfers the downlink and uplink transmission frames, transfers the uplink transmission frame to the first optical transmission/reception unit, and transfers the downlink transmission frame to the second optical transmission/reception unit.

13 Claims, 6 Drawing Sheets

INDUSTRIAL CONTROLLER APPARATUS CAPABLE OF LOW ERROR, ULTRA HIGH-SPEED SERIAL COMMUNICATION AND METHOD FOR DRIVING SAME

BACKGROUND OF THE INVENTION

1. Field of the Invention

The present invention relates generally to an industrial controller device, and more particularly to an industrial controller device capable of very high-speed serial communication.

2. Description of the Related Art

In general, plants using industrial controller devices employ a communication mechanism in which, in the state in which N EIA-485 interface devices have been connected to one host device or a small number of host devices using a multi-drop method in a 1:N correspondence, industrial controller devices are connected to the N EIA-485 interface devices in a 1:1 correspondence, thereby exchanging binary data, messages or packets with the hosts.

EIA-485 interfaces are low-speed serial interfaces. Although the number of EIA-485 interfaces that can be connected using a multi-drop method is limited to about 32, they are widely used because they have simple wiring.

As plants gradually become more elaborate and complicated, the number of industrial controller devices increases, and communication performance close to real-time performance is required. Although high-speed communication is not required from the perspective of a controller device in a terminal stage, high-speed communication is positively required from the perspective of a host device. Accordingly, there is a need for a network architecture and a communication interface capable of high-speed data transfer. In this scheme, a high-speed communication architecture is used up to a host device and a communication interface device, and conventional EIA-485 communication is used between the communication interface device and an industrial controller. In particular, industrial Ethernet using an IP address and packet exchange-type high-speed Ethernet interface device has emerged as a high-speed communication architecture.

However, industrial Ethernet is not compatible with an existing design scheme using controller devices, such as PLCs, because it is based on IP addresses. For example, in the existing scheme, the number of industrial controller devices may be repeatedly increased using a multi-drop method that is available in EIA-485. However, if such industrial Ethernet is employed, Ethernet interface devices need to be added using a hub, a switch, a bridge, or a repeater having a plurality of extension ports, and the Ethernet interface devices need to be connected via a subnet including controller devices not supporting an IP scheme and an Ethernet gateway.

Speed and costs can be generally balanced by employing a new high-speed Ethernet interface between the host and the Ethernet gateway device and continuously using an existing low-speed serial interface between the Ethernet gateway device and existing controller devices.

However, the above case is problematic in that design and installation are complicated, different types of networks should be managed during operation, and it is difficult to find a location where an error has occurred.

If controller devices include an Ethernet interface, the controllers cannot be connected using a multi-drop method, but should be connected to ports of a hub or a switch. For example, in the case of the overall air-conditioning system of a high-rise building, a multi-port hub should be installed in each floor, and the multi-port hub should be connected to air-conditioning units having Ethernet interfaces distributed throughout in the floor via Ethernet cables. When the Ethernet cables are connected to the air-condition units over long distances, data transfer errors frequently occur and transmission speed is reduced because the Ethernet cables have a limited transmission length. As a result, the advantage of the high-speed transmission ability of the Ethernet interface is cancelled by the above deficiencies.

SUMMARY OF THE INVENTION

Accordingly, the present invention has been made keeping in mind the above problems occurring in the prior art, and an object of the present invention is to provide an industrial controller device capable of very high-speed serial communication with an ultralow error rate and a method of driving the same.

In accordance with an aspect of the present invention, there is provided an industrial controller device, that is, at least one remote device, controlled by a host device, including a control unit configured to, depending on whether or not PCI of a downlink transmission frame in which Protocol Control Information (PCI) including at least one of unicast information, multicast information and broadcast information having an ID of a specific remote device has been combined with a Protocol Data Unit (PDU) corresponds to an ID of the industrial controller device, output the downlink transmission frame, or capture the downlink transmission frame in order to parse the PDU, extract a control message from the PDU upon parsing the PDU, and to generate control signals capable of driving sensors or drive elements in response to the extracted control message, internally generate an uplink transmission frame by combining PCI, including unicast information corresponding to an ID of the host device, with a PDU based on state information related to an operating state of the sensors or the drive elements and output the generated uplink transmission frame; a first optical transmission/reception unit configured to externally send or receive the uplink or downlink transmission frame; a second optical transmission/reception unit configured to have at least one port, and to externally send or receive the uplink or downlink transmission frame; and a switching unit configured to sequentially transfer the downlink transmission frame received from the first optical transmission/reception unit and the uplink transmission frame externally received from the second optical transmission/reception unit to the control unit, to transfer the uplink transmission frame received from the control unit to the first optical transmission/reception unit, and to transfer the downlink transmission frame received from the control unit to the second optical transmission/reception unit.

The control unit may include a PCI analysis unit configured to capture the received downlink transmission frame in order to parse the PDU if the PCI of the downlink transmission frame includes unicast information corresponding to the ID of the industrial controller device, to output the received downlink transmission frame to the switching unit if the PCI of the downlink transmission frame includes unicast information not corresponding to the ID of the industrial controller device, and to capture the downlink transmission frame in order to parse the PDU and also output the downlink transmission frame to the switching unit if the PCI of the downlink transmission frame includes multicast or broadcast information corresponding to the industrial controller device.

The control unit may include a PDU parsing unit configured to extract the PDU by parsing the captured transmission frame; a control signal generation unit configured to extract the control message from the extracted PDU, and to generate the control signals capable of driving the sensors or the drive elements in response to the extracted control message; a PDU generation unit configured to generate the PDU including state information related to the operating state of the sensors or the drive elements; and a transmission frame formatting unit configured to internally generate the uplink transmission frame by combining the PCI including unicast information corresponding to the ID of the host device with the generated PDU.

In accordance with another aspect of the present invention, there is provided an industrial controller device, that is, at least one remote device, controlled by a host device, including a control unit configured to extract a control message from a Protocol Data Unit (PDU) of a downlink transmission frame in which Protocol Control Information (PCI) including at least one of unicast information, multicast information and broadcast information having an ID of a specific remote device has been combined with the PDU, to generate control signals capable of driving sensors or drive elements in response to the extracted control message, to internally generate an uplink transmission frame by combining PCI, including unicast information corresponding to an ID of the host device, with a PDU based on state information related to an operating state of the sensors or the drive elements, and to output the generated uplink transmission frame; a first optical transmission/reception unit configured to externally send or receive the uplink or downlink transmission frame; a second optical transmission/reception unit configured to comprise at least one port and externally send or receive the uplink or downlink transmission frame; and a switching unit configured to output the downlink transmission frame to the second optical transmission/reception unit or transfer the downlink transmission frame to the control unit depending on whether or not PCI of the downlink transmission frame received from the first optical transmission/reception unit corresponds to the ID of the industrial controller device, to transfer the uplink transmission frame externally received from the second optical transmission/reception unit to the first optical transmission/reception unit, to transfer the uplink transmission frame received from the control unit to the first optical transmission/reception unit, and to transfer the downlink transmission frame received from the control unit to the second optical transmission/reception unit.

The switching unit may include first and second switches; the first switch may transfer the received downlink transmission frame to the control unit if the PCI of the downlink transmission frame includes unicast information corresponding to the ID of the industrial controller device, may output the received downlink transmission frame to the second switch if the PCI of the downlink transmission frame includes unicast information not corresponding to the ID of the industrial controller device, and may transfer the downlink transmission frame to the control unit and may also output the downlink transmission frame to the second switch if the PCI of the downlink transmission frame includes multicast/broadcast information corresponding to the ID of the industrial controller device; and the second switch may transfer the uplink transmission frame received from the control unit to the first optical transmission/reception unit and transfer the downlink transmission frame received from the control unit to the second optical transmission/reception unit.

In accordance with still another aspect of the present invention, there is provided an industrial controller device, that is, at least one remote device, controlled by a host device, including a first optical transmission/reception unit configured to externally receive a downlink transmission frame in which Protocol Control Information (PCI) including at least one of unicast information and multicast/broadcast information having an ID of a specific remote device is combined with a Protocol Data Unit (PDU) and sending an uplink transmission frame; a second optical transmission/reception unit configured to externally receive an uplink transmission frame, and to send a downlink transmission frame; a control unit configured to extract a control message from the PDU within the downlink transmission frame received from the first optical transmission/reception unit, to generate control signals capable of driving sensors or drive elements in response to the extracted control message, and to internally generate an uplink transmission frame by combining PCI, including unicast information corresponding to an ID of the host device, with a PDU according to state information related to an operating state of the sensors or the drive elements; and a switching unit configured to transfer the downlink transmission frame to at least one of the control unit and the second optical transmission/reception unit depending on whether or not the PCI of the received downlink transmission frame corresponds to an ID of the industrial controller device, and to sequentially transfer the uplink transmission frames received from the second optical transmission/reception unit and the control unit to the first optical transmission/reception unit.

The switching unit may include first and second switches; the first switch may transfer the received downlink transmission frame to the control unit if the PCI of the downlink transmission frame includes unicast information corresponding to the ID of the industrial controller device, may output the received downlink transmission frame to the second optical transmission/reception unit if the PCI of the downlink transmission frame includes unicast information not corresponding to the ID of the industrial controller device, and may transfer the downlink transmission frame to the control unit and also output the downlink transmission frame to the second optical transmission/reception unit if the PCI of the downlink transmission frame includes multicast/broadcast information corresponding to the ID of the industrial controller device; and the second switch may transfer the uplink transmission frame received from the second optical transmission/reception unit and the control unit to the first optical transmission/reception unit.

The uplink or downlink transmission frame may be formatted by adding, inserting, or partially overwriting the PCI into the PDU.

In accordance with still another aspect of the present invention, there is provided a method of driving an industrial controller device, that is, at least one remote device, controlled by a host device, the method including externally receiving a downlink transmission frame generated by combining Protocol Control Information (PCI), including at least one of unicast information, multicast information and broadcast information having an ID of a specific remote device, with a PDU; analyzing whether or not the PCI of the received downlink transmission frame corresponds to the industrial controller device; resending the downlink transmission frame downward or capturing the downlink transmission frame in order to parse the PDU depending on whether or not the PCI corresponds to the industrial controller device; extracting the PDU by parsing the downlink transmission frame; extracting a control message from the extracted PDU, and generating control signals capable of driving sensors or drive elements in response to the control message; generating an uplink transmission frame by combining PCI, including unicast information corresponding to an ID of the host device, with a PDU including state information related to an operating state of the sensors or the drive elements; and sending the generated uplink transmission frame or an externally received uplink transmission frame upward.

Resending the downlink transmission frame downward or capturing the downlink transmission frame in order to parse the PDU depending on whether or not the PCI corresponds to the industrial controller device may include capturing the received downlink transmission frame in order to parse the PDU if the PCI comprises unicast information corresponding to an ID of the industrial controller device; resending the received downlink transmission frame in an original transfer direction downward if the PCI comprises unicast information not corresponding to the ID of the industrial controller device; and capturing the received downlink transmission frame in order to parse the PDU and also resending the received downlink transmission frame downward if the PCI includes multicast or broadcast information corresponding to the ID of the industrial controller device.

The uplink or downlink transmission frame may be formatted by adding, inserting, or partially overwriting the PCI into the PDU.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Embodiments of the present invention will be described in detail with reference to the accompanying drawings. Like reference numerals will be used to designate like components throughout the accompanying drawings, and redundant descriptions of the like components will be omitted.

Figure 1:
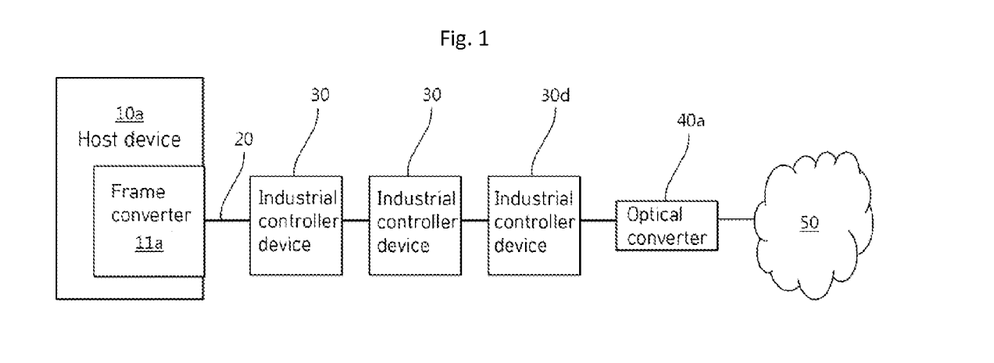
FIG. 1 is a conceptual diagram of an industrial control network over which industrial controller devices are connected according to an embodiment of the present invention.
Figure 2:
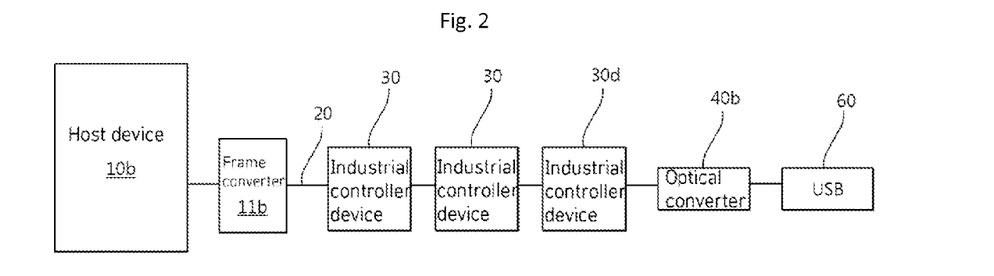
FIG. 2 is a conceptual diagram of an industrial control network over which industrial controller devices are connected according to another embodiment of the present invention.

FIGS. 1 and 2 are conceptual diagrams illustrating industrial control networks over which industrial controller devices are connected according to embodiments of the present invention.

Referring to FIG. 1, the industrial control network may include a host device 10a implemented based on, for example, user-programmable hardware such as a microcontroller, a server or a personal computer (PC), a Plastic Optical Fiber (POF) cable 20, and industrial controller devices 30.

Referring to FIG. 2, the industrial control network may include a host device 10b, an external frame converter 11b, a POF cable 20, and industrial controller devices 30.

Each of the host devices 10a and 10b may generate control messages capable of controlling each of the industrial controller devices 30, and may receive state information from each of remote devices, for example, the industrial controller devices 30.

For this purpose, each of the host devices 10a and 10b generates a control message for at least one industrial controller device 30d of the industrial controller devices 30 according to the present invention, and generates a Protocol Data Unit (PDU) as stipulated in accordance with a control specific protocol or a specific communication protocol, for example, Modbus, based on the generated control message.

An internal frame converter 11a embedded in the host device 10a in the case of FIG. 1 and the external frame converter 11b connected to the host device 10b in the case of FIG. 2 each insert Protocol Control Information (PCI), including at least one of unicast information and multicast/broadcast information having the ID of the industrial controller device 30d corresponding to the destination of downlink transmission, into a PDU into the PDU, reformat or encapsulate the PDU into a downlink transmission frame, and optically output the PDU through the POF cable 20 downward. The PCI may further include a message capable of controlling how the destination industrial controller device 30d will handle the PDU.

In this specification, the unicast information is representative of information about a single information sender and a single information receiver when the single information sender attempts to communicate with the single information receiver.

In contrast, the multicast information is representative of information about a single information sender and a group of one or more information receivers when the single information sender attempts to communicate with the group. Meanwhile, broadcast information is representative of information about the unspecificity of information receivers when a single information sender attempts to communicate with all information receivers who are within a network.

In the case of uplink transmission, each of the frame converters 11a and 11b may receive an uplink transmission frame, including a PDU generated by a specific industrial controller device 30, through the POF cable 20, may remove PCI from the received uplink transmission frame and thus extract only the PDU based on a corresponding protocol that is understood by each of the host devices 10a and 10b, and may then provide the PDU to each of the host devices 10a and 10b.

In some embodiments, the PCI may further include a flag indicating that a transmission frame is a frame for uplink or downlink transmission.

An operation that is substantially the same as the reformatting or encapsulation of a frame that is performed by each of the frame converters 11a and 11b may be also performed when the industrial controller device 30 should output a PDU.

Figure 3:
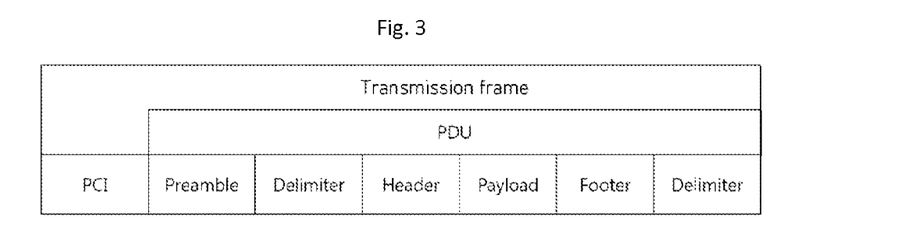
FIG. 3 is an exemplary frame format for the industrial controller device according to an embodiment of the present invention.
Figure 4:
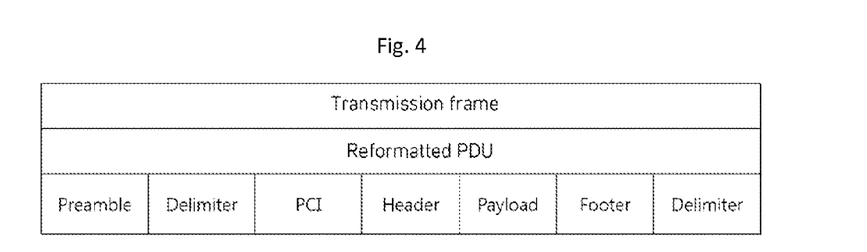
FIG. 4 is another exemplary frame format for the industrial controller device according to an embodiment of the present invention.
Figure 5:
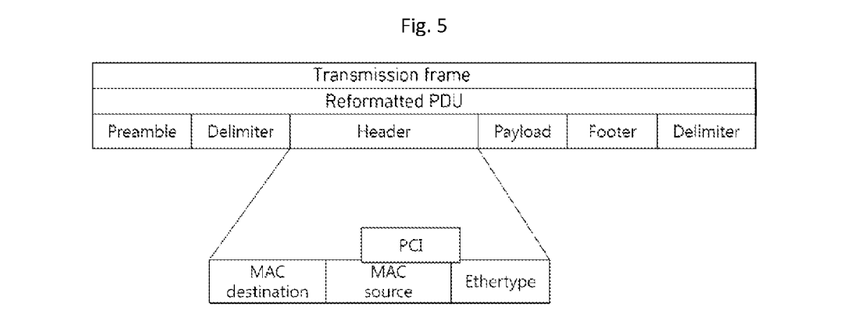
FIG. 5 is yet another exemplary frame format for the industrial controller device according to an embodiment of the present invention.

Reference is made to FIGS. 3 to 5 in order to illustrate a transmission frame that is reformatted or encapsulated by the frame converter 11a or 11b and the industrial controller device 30. FIGS. 3, 4, and 5 are example frame formats for industrial controller devices according to an embodiment of the present invention.

In FIG. 3, 4 or 5, a PDU may be generated in accordance with any one of various packet exchange- or message exchange-type commercial control protocols, such as EtherCAT, Ethernet Global Data (EGD), EtherNet/IP, Ethernet Powerlink, Fieldbus, Modbus, Profibus, a Common Industrial Protocol (CIP), ControlNet, DeviceNet, and a Controller Area Network (CAN) bus, protocols equivalent to or improved from the commercial protocols, various general-purpose communication protocols, such as Ethernet, a Universal Serial Bus (USB), Serial ATA (SATA), external SATA (eSATA), and a Small Computer System Interface (SCSI), and protocols equivalent to or improved from the general-purpose communication protocols.

No matter which type of communication protocol is used, a frame typically including a packet or a message starts with a preamble and a delimiter as long as the protocol is based on serial communication. The preamble defines the start of the frame and the time length of each symbol, and may further include a clock recovery function. The delimiter indicates that a substantial packet starts subsequent to the preamble. A header, a payload, and a footer follow the delimiter in accordance with predetermined rules.

The frame format illustrated in FIG. 3 shows a frame that has been encapsulated by adding PCI before a PDU (i.e., as a header) or behind a PDU (i.e., as a footer) without changing the PDU. In this case, an InterFrame Gap (IFG) between the original PDU and a subsequent PDU may be reduced by the bit length of bits of the added PCI.

In contrast, the frame format of FIG. 4 shows a frame that has been reformatted by inserting PCI behind the preamble and delimiter of an original PDU. In this case, an IFG between PDUs may be reduced by the length of bits of the added PCI.

The frame format of FIG. 5 shows a frame into which PCI has been inserted using a slot or bits if the use of the slot in the header of an original PDU has been reserved in accordance with a protocol, if the slot is not used depending on the circumstance, or if the bits are substantially unnecessary because the bits are not changed in any case and can be derived.

For example, if a PDU corresponds to an Ethernet frame, a header behind a delimiter includes source Media Access Control (MAC) ID information or a source MAC address and destination MAC ID information that have a size of 6 octets. Since downlink frames directed toward a specific controller device 30 are generated by the host device 10 in any case, it is evident that the source of the downlink frames is the host device 10 even when reference is not made to the source MAC address of a corresponding slot. Accordingly, the source MAC address information is redundant information. In this case, if the PCI has a size equal to or smaller than 6 octets, that is, 6 bytes, each of the downlink frames may be reformatted by adding the PCI while maintaining an overall frame length in such a way as to overwrite the PCI into a slot allocated to the source MAC ID information.

In this case, if a specific controller device 30 needs to restore the first Ethernet frame, the controller device 30 may restore the original Ethernet frame by overwriting the already known MAC ID information of the host device 10 into a slot of a transmission frame on which PCI has been recorded.

In contrast, since the uplink frames are directed toward the host device 10 in any case, it is evident that the destination of uplink frames directed from a specific controller device 30 to the host device 10 is the host device 10 even when reference is not made to the destination MAC address of a corresponding slot. In this case, PCI includes 6 octets. That is, if the PCI has a size equal to or smaller than 6 octets, that is, 6 bytes, the uplink frame may be reformatted by adding the PCI while maintaining the overall frame length in such a way as to overwrite the PCI into a slot allocated to destination MAC ID information.

However, the checksum information of a footer needs to be appropriately changed if necessary.

The overall lengths of the transmission frame formats of FIGS. 3 and 4 increase before or after reformatting, whereas the overall length of the transmission frame format of FIG. 5 does not change before or after to reformatting.

Each of the frame converters 11a and 11b and the industrial controller device 30 performs a reformatting operation of inserting, adding or overwriting PCI into a PDU if a downlink transmission frame is to be generated. In contrast, each of the frame converters 11a and 11b and the industrial controller device 30 performs a restoration operation of removing or overwriting PCI from or into a received frame if an uplink transmission frame is to be generated.

In addition, the industrial controller device 30d may be connected to another network 50, for example, an Ethernet network, via an optical converter 40a. The industrial controller device 30d may function to transfer the PDU of a received downlink transmission frame to the Ethernet network 50 as an Ethernet frame, or, in a reverse manner, may function to receive an Ethernet frame over an Ethernet network 50 and to generate an uplink transmission frame using the received Ethernet frame as a PDU.

In this case, the PCI may further include bits capable of controlling how the industrial controller device 30d will handle the PDU. For example, when a transmission frame is received, the destination industrial controller device 30d may restore the PDU in accordance with a control message included in the PCI and output the restored PDU to the network 50. If the network 50 is an Ethernet network and the PDU is an Ethernet frame, the network 50 may be naturally connected to the host device 10 in accordance with an Ethernet standard regardless of how the Ethernet frame is transferred between the host device 10 and the optical converter 40a.

Likewise, if the PDU is a USB packet and a USB device 60 is connected to the optical converter 40b, the USB device 60 may be used as if it were connected to a common host PC.

In this case, each of the optical converters 40a and 40b functions to simply convert an optical signal of the industrial controller device 30d into an electrical signal and vice versa.

Meanwhile, the industrial controller device 30 is connected to a plurality of sensors and a plurality of drive elements in order to drive the various types of equipment in a plant. A control message generated by the host device 10 may be a command that requires desired results, rather than a command that directly drives each of sensors or drive elements distributed across large-scale equipment. For example, the host device 10 may send a control message instructing a No. 1 conveyer to move 100 m at 1 m/s to the industrial controller device 30 that drives conveyer belt equipment. In response to the control message, the industrial controller device 30 may instantaneously generate specific control signals capable of driving drive elements, for example, control signals capable of generating desired motor RPM, torque and gear ratio in order to obtain results in accordance with the control message.

For this purpose, when a downlink transmission frame generated by the host device 10 and directed toward at least one industrial controller device 30 is received, the industrial controller device 30 identifies the PCI of the downlink transmission frame.

In other words, the industrial controller device 30 receives the downlink transmission frame that is generated by inserting, adding or overwriting the PCI including at least unicast, multicast or broadcast information having the ID of the industrial destination controller device 30 into a PDU including the control message, and resends the downlink transmission frame or captures the downlink transmission frame to perform additional processing based on the PCI of the received downlink transmission frame.

If the identified PCI includes multicast or broadcast information related to the industrial controller device 30, the industrial controller device 30 resends the downlink transmission frame downward, extracts a PDU from the downlink transmission frame, and controls the operation of sensors or drive elements connected to the industrial controller device 30 in accordance with the control message of the extracted PDU.

If the identified PCI includes only unicast information corresponding to the ID of the industrial controller device 30, the industrial controller device 30 does not resend the downlink transmission frame downward, but extracts a PDU from the downlink transmission frame and controls the operations of sensors or drive elements connected to the industrial controller device 30 in accordance with the control message of the extracted PDU.

If the extracted PCI includes unicast information not corresponding to the ID of the industrial controller device 30, the industrial controller device 30 resends the downlink transmission frame downward, but does not extract a PDU from the downlink transmission frame.

Furthermore, if the industrial controller device 30 needs to report its state information to the host device 10, the industrial controller device 30 may generate a PDU including state information, may generate an uplink transmission frame by combining the PDU including the state information with a PDU including the ID of the industrial controller device 30 based on the generated PDU, and may optically output the generated uplink transmission frame upward.

Figure 6:
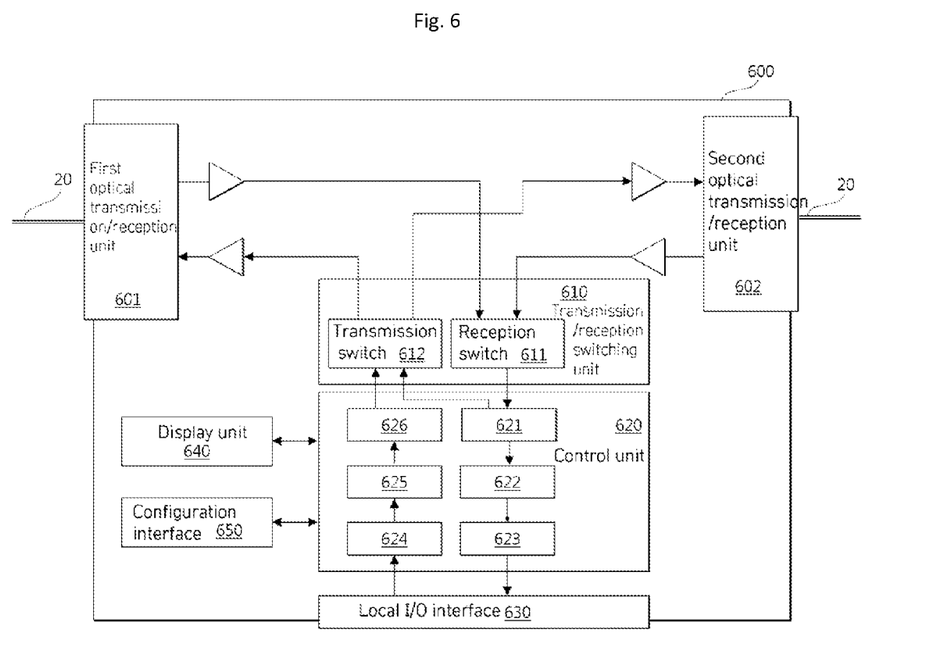
FIG. 6 is a block diagram of an industrial controller device according to an embodiment of the present invention.

FIG. 6 is a detailed block diagram of the control unit of an industrial controller device according to an embodiment of the present invention.

Referring to FIG. 6, the industrial controller device 600 may include a first optical transmission/reception unit 601, a second optical transmission/reception unit 602 for at least one port, a transmission/reception switching unit 610, a control unit 620, a local I/O interface 630, a display unit 640, and a configuration interface 650.

Each of the first optical transmission/reception unit 601 and the second optical transmission/reception unit 602 may optically receive and send signals, for example, over the POF cable 20. The POF cable 20 may perform transmission and reception over a pair of POF optical fibers.

The first optical transmission/reception unit 601 is connected to the host device 10. Although the second optical transmission/reception unit 602 has been illustrated as including two transmission and reception ports in FIG. 6, the second optical transmission/reception unit 602 may include a single transmission and reception port or an appropriate number of transmission and reception ports depending on a designer's intention, and the second optical transmission/reception unit 602 may be connected to at least one industrial controller device 30.

The transmission/reception switching unit 610 may include a reception switch 611 and a transmission switch 612.

The reception switch 611 sequentially inputs transmission frames, received from the first and second optical transmission/reception units 601 and 602, to the control unit 620. The transmission switch 612 transfers uplink and downlink transmission frames, output from the control unit 620, to at least one of the first and second optical transmission/reception units 601 and 602 depending on whether they are uplink or downlink frames.

In this case, at least one overall port of the second optical transmission/reception unit 602 may output the same downlink transmission frames.

The control unit 620 may include a PCI analysis unit 621, a PDU parsing unit 622, a control signal generation unit 623, a state information reception unit 624, a PDU generation unit 625, and a transmission frame formatting unit 626.

The PCI analysis unit 621 transfers each of received transmission frames to at least one of the PDU parsing unit 622 and the second reception switch 612 based on the results of analysis of the PCI of the received transmission frame.

In greater detail, if the PCI includes unicast information corresponding to the ID of the industrial controller device 600, the PCI analysis unit 621 transfers the received transmission frame to the PDU parsing unit 622.

Furthermore, if, as a result of the analysis of the received transmission frame, the PCI includes unicast information not corresponding to the ID of the industrial controller device 600, the PCI analysis unit 621 transfers the received transmission frame to the second reception switch 612.

If, as a result of the analysis of the received transmission frame, the PCI includes multicast/broadcast information corresponding to the ID of the industrial controller device 600, the PCI analysis unit 621 transfers the received transmission frame to the PDU parsing unit 622 and the second reception switch 612.

In this case, if the transmission frame is an uplink transmission frame directed toward the host device 10, the transmission frame may be generalized, as in the case where PCI includes unicast information not corresponding to the ID of the industrial controller device 600.

If a transmission frame is received from the PCI analysis unit 621, the PDU parsing unit 622 extracts a PDU from the transmission frame based on a protocol that was used by the host device 10 when the host device 10 generated the PDU.

The control signal generation unit 623 is an element on which a control program, that is, the core of the industrial controller device 600, runs. The control signal generation unit 623 extracts a control message related to the operation of the industrial controller device 600 from an extracted PDU, and generates one or more digital and/or analog control signals that will substantially drive sensors or drive elements connected to the industrial controller device 600 based on the extracted control message. The generated control signals are output to the sensors or drive elements via the local I/O interface 630.

The state information reception unit 624 receives the sensing information of the sensors or the operating state information of the drive elements via the local I/O interface 630, and manages the digitized information.

If the industrial controller device 600 needs to report state information to the host device 10, the PDU generation unit 625 generates a PDU in accordance with a specific control and/or communication protocol based on the state information of the sensors or the drive elements.

The transmission frame formatting unit 626 may generate a transmission frame by inserting, adding or overwriting PCI into a PDU generated by the PDU generation unit 625 based on the ID information of the industrial controller device 600, and may output the generated transmission frame to the transmission switch 612.

In some embodiments, each of the elements 621 to 626 of the control unit 620 may be implemented so that it complies with the OSI 7 layer model at least partially.

In the present embodiment, since the transmission/reception switching unit 610 is substantially connected to the switching unit of the controller device 30 in a front or rear stage in a 1:1 correspondence, MAC addresses are not essentially required for the switches 611 and 612 of the transmission/reception switching unit 610, and a need for a router may be also obviated.

The local I/O interface 630 functions to transfer control signals to an actuator, a motor, a valve, a pump and a power supply unit that actually operate within equipment equipped with the industrial controller device 600 and to receive sensing signals from the sensors. The local I/O interface 630 may be implemented using a low-speed data communication interface based on any of various methods, such as uART, RS-232C, and EIA-485/422.

The display unit 640 may be implemented simply as a bulb or buzzer that flickers on and off, or complicatedly as a touch screen.

The configuration interface 650 is a user interface that locally sets the operating environment of the industrial controller device 600, such as a device ID, on the spot. The configuration interface 650 may be implemented simply as a jumper or a Dual In-line Package (DIP) switch module, or complicatedly as a cheap low-speed data communication interface, such as uART or RS-232C.

Figure 7:
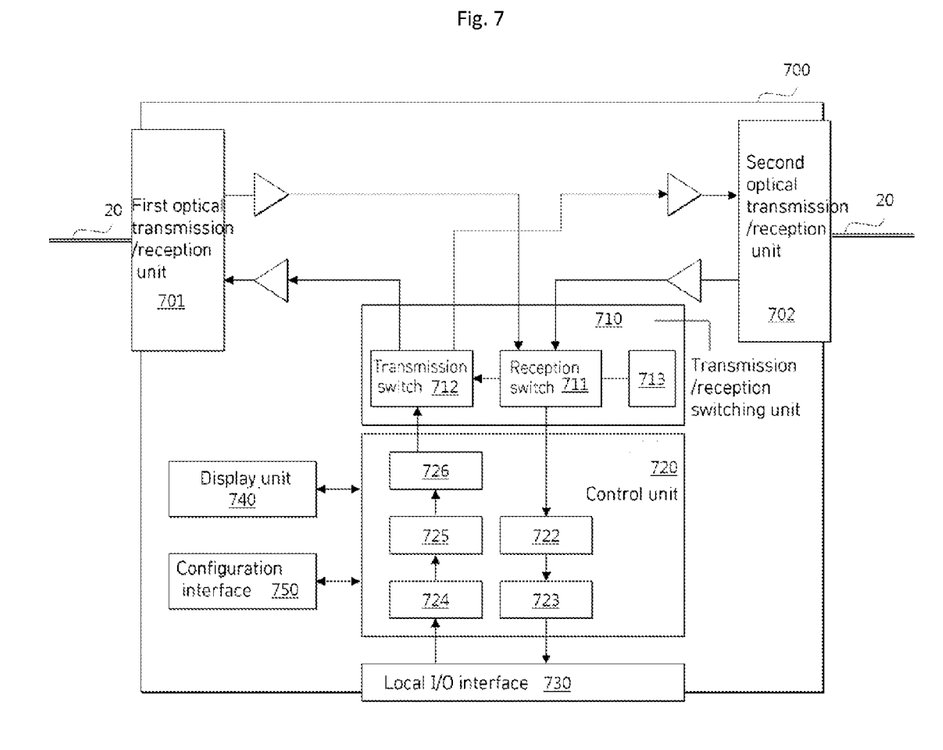
FIG. 7 is a block diagram of an industrial controller device according to another embodiment of the present invention.

FIG. 7 is a block diagram of an industrial controller device 700 according to another embodiment of the present invention.

Referring to FIG. 7, the industrial controller device 700 may include a first optical transmission/reception unit 701, a second optical transmission/reception unit 702 having at least one port, a transmission/reception switching unit 710, a control unit 720, a local I/O interface 730, a display unit 740, and a configuration interface 750.

The first optical transmission/reception unit 701, second optical transmission/reception unit 702 having at least one port, local I/O interface 730, display unit 740 and configuration interface 750 of the industrial controller device 700 illustrated in FIG. 7 may have substantially the same configurations and operations as the first optical transmission/reception unit 601, second optical transmission/reception unit 602 having at least one port, the local I/O interface 630, display unit 640 and configuration interface 650 of the industrial controller device 600 illustrated in FIG. 6. Accordingly, descriptions thereof will be omitted.

The transmission/reception switching unit 710 may include a reception switch 711 configured to determine the transfer path of transmission frames, a transmission switch 712, and an ID register 713 configured to store information about the ID of the industrial controller device 700.

The reception switch 711 transfers received transmission frames to at least one of the PDU parsing unit 722 of the control unit 720 and the transmission switch 712 based on the results of the analysis of the PCI of the received transmission frames.

In greater detail, the reception switch 711 compares the PCI of each of the transmission frames, received from the first and the second optical transmission/reception units 701 and 702, with ID information stored in the ID register 713, and, if, as a result of the comparison, the PCI is found to include unicast information corresponding to the ID of the industrial controller device 700, transfers the received transmission frame to the PDU parsing unit 722 of the control unit 720.

If, as a result of the comparison, the PCI is found to include unicast information not corresponding to the ID of the industrial controller device 700, the reception switch 711 transfers the received transmission frame directly to the transmission switch 712.

If, as a result of the comparison, the PCI is found to include multicast/broadcast information corresponding to the ID of the industrial controller device 700, the reception switch 711 transfers the received transmission frame to both the PDU parsing unit 722 of the control unit 720 and the transmission switch 712.

In this case, if the transmission frame is an uplink transmission frame directed toward the host device 10, the transmission frame may be generalized, as in the case where PCI includes unicast information not corresponding to the industrial controller device 700.

The transmission switch 712 transfers uplink/downlink transmission frames received from the reception switch 711 or uplink transmission frames received from the control unit 720 to at least one of the first and second optical transmission/reception units 701 and 702 depending on whether the transmission frames are uplink or downlink frames.

In this case, at least one port of the second optical transmission/reception unit 702 may output the same downlink transmission frames.

In the present embodiment, since the transmission/reception switching unit 710 is substantially connected to the switching unit of the controller device 30 in a front stage or a rear stage in a 1:1 correspondence, MAC addresses are not essentially required for the switches 711 and 712 of the transmission/reception switching unit 710 and a need for a router may be also obviated.

The control unit 720 may further include a PDU parsing unit 722, a control signal generation unit 723, a state information reception unit 724, a PDU generation unit 725, and a transmission frame formatting unit 726.

If a transmission frame is received from the reception switch 711, the PDU parsing unit 722 extracts a PDU from the transmission frame in accordance with a protocol that was used by the host device 10 when the host device 10 generated the PDU.

The control signal generation unit 723 extracts a control message related to the operation of the industrial controller device 700 from the extracted PDU, and generates one or more digital and/or analog control signals that will actually drive sensors or drive elements connected to the industrial controller device 700 in response to the extracted control message. The generated control signals are output to the sensors or the drive elements via the local I/O interface 730.

The state information reception unit 724 receives the sensing information of the sensors or the operating state information of the drive elements via the local I/O interface 730, and manages digitized information.

If the industrial controller device 700 needs to report its state information to the host device 10, the PDU generation unit 725 generates a PDU in accordance with a specific control and/or communication protocol based on the state information of the sensors or drive elements.

The transmission frame formatting unit 726 may generate a transmission frame that is generated by inserting, adding or overwriting PCI generated based on information about the ID of the industrial controller device 700 into the PDU generated by the PDU generation unit 725, and may output the generated transmission frame to the transmission switch 712.

In some embodiments, each of the elements 722 to 726 of the control unit 720 may be implemented so that it complies with the OSI 7 layer mode at least partially.

Figure 8:
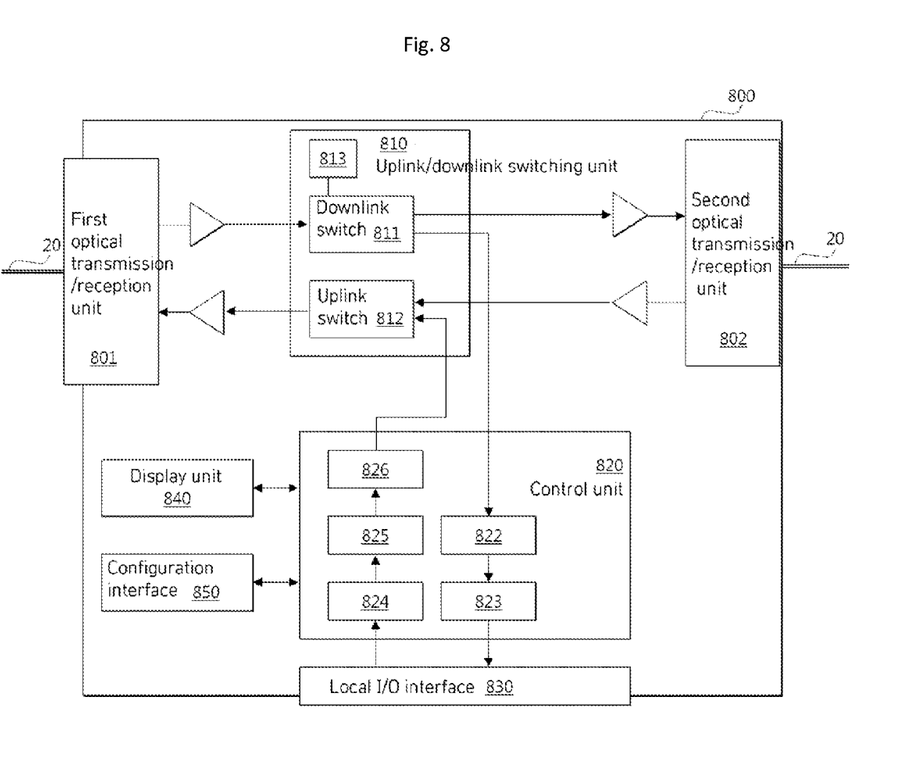
FIG. 8 is a block diagram of an industrial controller device according to still another embodiment of the present invention.

FIG. 8 is a block diagram of an industrial controller device according to still another embodiment of the present invention.

Referring to FIG. 8, the industrial controller device 800 may include a first optical transmission/reception unit 801, a second optical transmission/reception unit 802 having at least one port, an uplink/downlink switching unit 810, a control unit 820, a local I/O interface 830, a display unit 840, and a configuration interface 850.

The first optical transmission/reception unit 801, second optical transmission/reception unit 802 having at least one port, local I/O interface 830, display unit 840 and configuration interface 850 of the industrial controller device 800 illustrated in FIG. 8 may have substantially the same configurations and operations as the first optical transmission/reception unit 601, second optical transmission/reception unit 602 having at least one port, local I/O interface 630, the display unit 640 and configuration interface 650 of the industrial controller device 600 illustrated in FIG. 6. Accordingly, descriptions thereof will be omitted.

The uplink/downlink switching unit 810 may include a downlink switch 811, an uplink switch 812, and an ID register 813.

The downlink switch 811 transfers each of received transmission frames to at least one of the PDU parsing unit 822 of the control unit 820 and the second optical transmission/reception unit 802 based on the result of the analysis of the PCI of the transmission frame.

In greater detail, the downlink switch 811 compares the PCI of the transmission frame, received from the first optical transmission/reception unit 701, with ID information stored in the ID register 813, and, if, as a result of the comparison, the PCI is found to include unicast information corresponding to the ID of the industrial controller device 800, transfers the transmission frame to the PDU parsing unit 822 of the control unit 820.

If, as a result of the comparison, the PCI is found to include unicast information not corresponding to the ID of the industrial controller device 800, the downlink switch 811 transfers the received transmission frame directly to the second optical transmission/reception unit 802.

If, as a result of the comparison, the PCI is found to include multicast/broadcast information corresponding to the ID of the industrial controller device 800, the downlink switch 811 transfers the received transmission frame to both the PDU parsing unit 822 of the control unit 820 and the second optical transmission/reception unit 802.

In this case, at least one port of the second optical transmission/reception unit 802 may output the same downlink transmission frames.

The uplink switch 812 sequentially transfers uplink transmission frames received from the second optical transmission/reception unit 802 or uplink transmission frames received from the control unit 820 to the first optical transmission/reception unit 801.

In the present embodiment, since the transmission/reception switching unit 810 is substantially connected to the switching unit of the controller device 30 in a front stage or a rear stage in a 1:1 correspondence, MAC addresses are not essentially required for the switches 811 and 812 of the uplink/downlink switching unit 810, and a need for a router may be also obviated.

The control unit 820 may include a PDU parsing unit 822, a control signal generation unit 823, a state information reception unit 824, a PDU generation unit 825, and a transmission frame formatting unit 826.

If a transmission frame is received from the downlink switch 811, the PDU parsing unit 822 extracts a PDU from the transmission frame in accordance with a protocol that was used by the host device 10 when the host device 10 generated the PDU.

The control signal generation unit 823 extracts a control message related to the operation of the industrial controller device 800 from the extracted PDU, and generates one or more digital and/or analog control signals that will actually drive sensors or drive elements connected to the industrial controller device 800 in response to the extracted control message. The generated control signals are output to the sensors or the drive elements via the local I/O interface 830.

The state information reception unit 824 receives sensing information from the sensors or information about the operating states of the drive elements via the local I/O interface 830, and manages the digitized information.

If the industrial controller device 800 needs to report its state information to the host device 10, the PDU generation unit 825 generates a PDU in accordance with a specific control and/or communication protocol based on the state information of the sensors or the drive elements.

The transmission frame formatting unit 826 may generate a transmission frame that is generated by inserting, adding or overwriting PCI generated based on information about the ID of the industrial controller device 800 into the PDU generated by the PDU generation unit 825, and may output the transmission frame to the uplink switch 812.

In some embodiments, each of the elements 822 to 826 of the control unit 820 may be implemented so that it complies with the OSI 7 layer mode at least partially.

Figure 9:
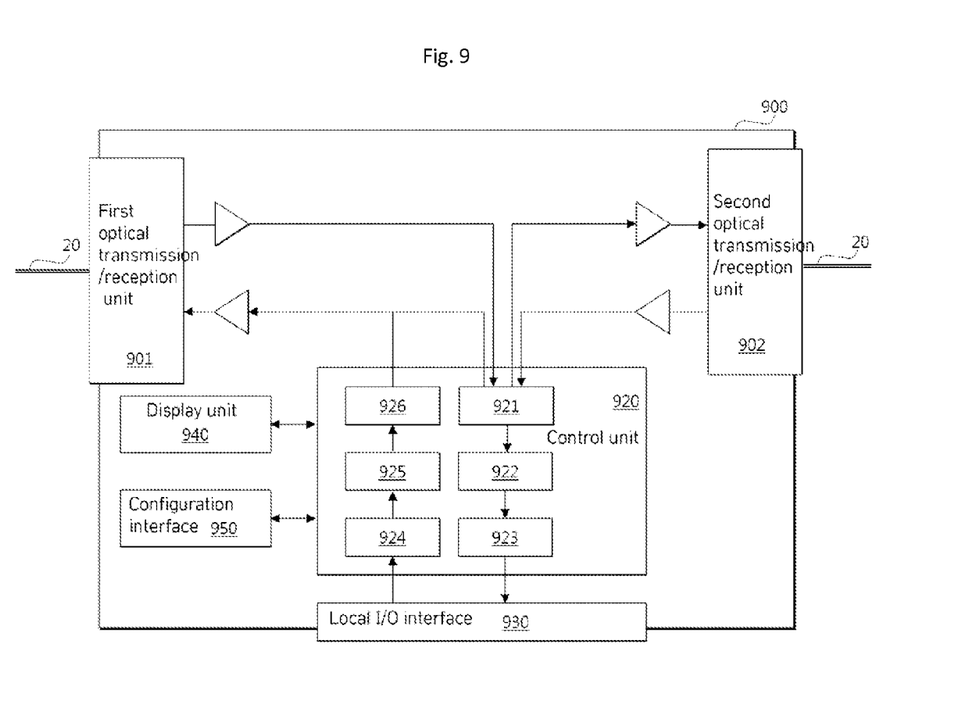
FIG. 9 is a block diagram of an industrial controller device according to further another embodiment of the present invention.

FIG. 9 is a block diagram of an industrial controller device according to further another embodiment of the present invention.

Referring to FIG. 9, the industrial controller device 900 may include a first optical transmission/reception unit 901, a second optical transmission/reception unit 902 having at least one port, a control unit 920, a local I/O interface 930, a display unit 940, and a configuration interface 950.

The first optical transmission/reception unit 901, second optical transmission/reception unit 902 having at least one port, local I/O interface 930, the display unit 940 and configuration interface 950 of the industrial controller device 900 illustrated in FIG. 9 may have substantially the same configurations and operations to the first optical transmission/reception unit 601, second optical transmission/reception unit 602 having at least one port, local I/O interface 630, display unit 640 and configuration interface 650 of the industrial controller device 600 illustrated in FIG. 6. Accordingly, descriptions thereof will be omitted. Unlike in the embodiments of FIGS. 6 to 8, the control unit 920 of the industrial controller device 900 performs a switching operation.

Uplink/downlink transmission frames that are received by the first and second optical transmission/reception units 901 and 902 are transferred to the control unit 920 without change. An uplink transmission frame that is generated by the control unit 920 is transferred to the first optical transmission/reception unit 901, and is then output. A downlink transmission frame that is generated by the control unit 920 is transferred to the second optical transmission/reception unit 902, and is then output.

The control unit 920 may include a PCI analysis unit 921, a PDU parsing unit 922, a control signal generation unit 923, a state information reception unit 924, a PDU generation unit 925, and a transmission frame formatting unit 926.

The PCI analysis unit 921 transfers each of received uplink/downlink transmission frames to the PDU parsing unit 922, or outputs the uplink/downlink transmission frame via one of the first and the second optical transmission/reception units 901 and 902 based on the result of the analysis of the PCI of the uplink/downlink transmission frame.

In greater detail, if the PCI includes unicast information corresponding to the ID of the industrial controller device 900, the PCI analysis unit 921 transfers the received transmission frame to the PDU parsing unit 922.

If, as a result of analysis of a received downlink transmission frame, the PCI includes unicast information not corresponding to the ID of the industrial controller device 900, the PCI analysis unit 921 transfers the received transmission frame to the second optical transmission/reception unit 902.

If, as a result of the analysis of a received transmission frame, the PCI includes multicast/broadcast information corresponding to the ID of the industrial controller device 900, the PCI analysis unit 921 transfers the received transmission frame to both the PDU parsing unit 922 and the second optical transmission/reception unit 902.

If the received transmission frame is an uplink transmission frame directed toward the host device 10, the PCI analysis unit 921 transfers the received transmission frame to the first optical transmission/reception unit 901.

If the transmission frame is received from the PCI analysis unit 921, the PDU parsing unit 922 extracts a PDU from the transmission frame in accordance with a protocol that was used by the host device 10 when the host device 10 generated the PDU.

The control signal generation unit 923 extracts a control message related to the operation of the industrial controller device 900 from the extracted PDU, and generates one or more digital and/or analog control signals that will actually drive sensors or drive elements connected to the industrial controller device 900 in response to the extracted control message. The generated control signals are output to the sensors or the drive elements via the local I/O interface 930.

The state information reception unit 924 receives the sensing information of the sensors or the operating state information of the drive elements via the local I/O interface 930, and manages the digitized information.

If the industrial controller device 900 needs to report its state information to the host device 10, the PDU generation unit 925 generates a PDU in accordance with a specific control and/or communication protocol based on the state information of the sensors or the drive elements.

The transmission frame formatting unit 926 may generate a transmission frame that is generated by inserting, adding or overwriting PCI generated based on information about the ID of the industrial controller device 900 into the PDU generated by the PDU generation unit 925, and may output the generated transmission frame to the first optical transmission/reception unit 901.

In some embodiments, each of the elements 921 to 926 of the control unit 920 may be implemented so that it complies with the OSI 7 layer mode at least partially.

Figure 10:
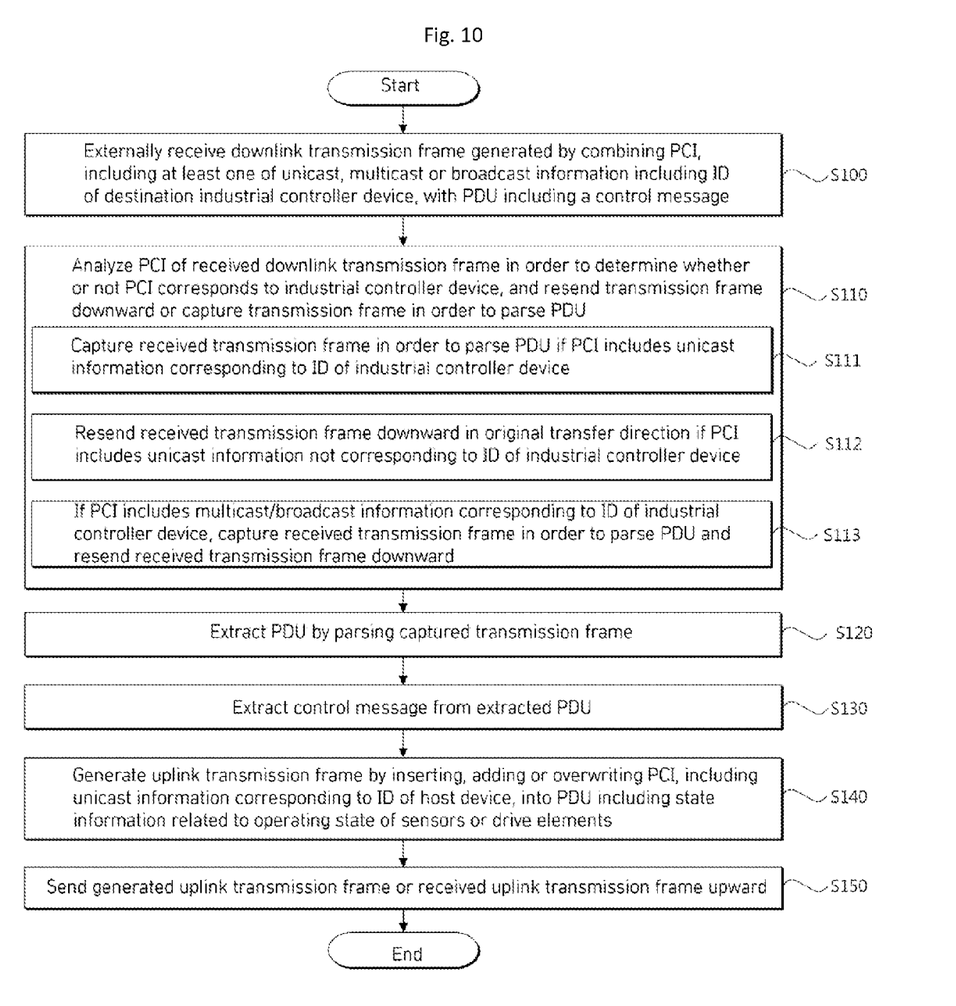
FIG. 10 is a flowchart illustrating a method of driving the industrial controller device according to embodiments of the present invention.

FIG. 10 is a flowchart illustrating a method of driving the industrial controller device according to an embodiment of the present invention.

Referring to FIG. 10, the method of driving the industrial controller device, that is, at least one remote device, controlled by the host device may start with step S100 at which a downlink transmission frame that is generated by inserting, adding or overwriting PCI including unicast, multicast or broadcast information including the ID of the destination industrial controller device 30 into a PDU including a control message may be received externally.

At step S110, the PCI of the received downlink transmission frame is analyzed in order to determine whether or not the PCI corresponds to the industrial controller device 30. The transmission frame is retransmitted downward or captured in order to parse the PDU at steps S111 to S113 based on the results of the analysis of the PCI.

In greater detail, if the PCI includes unicast information corresponding to the ID of the industrial controller device 30 at step S110, the received transmission frame is captured in order to parse the PDU at step S111.

If the PCI includes unicast information not corresponding to the ID of the industrial controller device 30 at step S110, the received transmission frame is retransmitted downward in an original transfer direction at step S112.

If the PCI includes multicast/broadcast information corresponding to the ID of the industrial controller device 30 at step S110, the received transmission frame is captured in order to parse the PDU and at the same time the received transmission frame is retransmitted downward at step S113.

At step S120, the PDU is extracted by parsing the transmission frame captured at step S111 or S113.

At step S130, a control message is extracted from the extracted PDU, and control signals capable of driving the sensors or the drive elements are generated in response to the control message.

At step S140, an uplink transmission frame is generated by inserting, adding or overwriting PCI including unicast information corresponding to the ID of the host device 10 into the PDU including state information related to the operating state of the sensors or the drive elements.

At step S150, the generated uplink transmission frame or externally received uplink transmission frame is transmitted upward.

In some embodiments, the uplink transmission of the received uplink transmission frame at step S150 may be generalized, as in the case where the output direction of the received uplink transmission frame is an upward direction, that is, the case where a destination is the host device 10, among the cases where the PCI of the received transmission frame includes unicast information not corresponding to the industrial controller device 30.

As described above, in accordance with the industrial controller device and the method of driving the same according to the present invention, it may be possible to easily increase the number of industrial controller devices while maintaining very high-speed serial data transmission performance.

In accordance with the industrial controller device and the method of driving the same according to the present invention, it may be possible to design and deploy an over network using only a host device, industrial controller devices and a POF cable, and it may be possible to obviate a need for a hub, a switch, a gateway device, and a repeater device.

In accordance with the industrial controller device and the method of driving the same according to the present invention, the controller device may be used as a communication relay path for controller devices using various different protocols.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An industrial controller device, that is, at least one remote device, controlled by a host device, comprising:
   a control unit configured to, depending on whether or not PCI of a downlink transmission frame in which Protocol Control Information (PCI) including at least one of unicast information, multicast information and broadcast information having an ID of a specific remote device has been combined with a Protocol Data Unit (PDU) corresponds to an ID of the industrial controller device, output the downlink transmission frame, or capture the downlink transmission frame in order to parse the PDU, extract a control message from the PDU upon parsing the PDU, generate control signals capable of driving sensors or drive elements in response to the extracted control message, and to internally generate an uplink transmission frame by combining PCI, including unicast information corresponding to an ID of the host device, with a PDU based on state information related to an operating state of the sensors or the drive elements and output the generated uplink transmission frame;
   a first optical transmission/reception unit configured to externally send or receive the uplink or downlink transmission frame;
   a second optical transmission/reception unit configured to have at least one port, and to externally send or receive the uplink or downlink transmission frame; and
   a switching unit configured to sequentially transfer the downlink transmission frame received from the first optical transmission/reception unit and the uplink transmission frame externally received from the second optical transmission/reception unit to the control unit, to transfer the uplink transmission frame received from the control unit to the first optical transmission/reception unit, and to transfer the downlink transmission frame received from the control unit to the second optical transmission/reception unit.

2. The industrial controller device of claim 1, wherein the control unit comprises a PCI analysis unit configured to capture the received downlink transmission frame in order to parse the PDU if the PCI of the downlink transmission frame includes unicast information corresponding to the ID of the industrial controller device, to output the received downlink transmission frame to the switching unit if the PCI of the downlink transmission frame includes unicast information not corresponding to the ID of the industrial controller device, and to capture the downlink transmission frame in order to parse the PDU and also output the downlink transmission frame to the switching unit if the PCI of the downlink transmission frame includes multicast or broadcast information corresponding to the industrial controller device.

3. The industrial controller device of claim 1, wherein the control unit comprises:
   a PDU parsing unit configured to extract the PDU by parsing the captured transmission frame;
   a control signal generation unit configured to extract the control message from the extracted PDU, and to generate the control signals capable of driving the sensors or the drive elements in response to the extracted control message;
   a PDU generation unit configured to generate the PDU including state information related to the operating state of the sensors or the drive elements; and
   a transmission frame formatting unit configured to internally generate the uplink transmission frame by combining the PCI including unicast information corresponding to the ID of the host device with the generated PDU.

4. The industrial controller device of claim 1, wherein the uplink or downlink transmission frame is formatted by adding, inserting, or partially overwriting the PCI into the PDU.

5. An industrial controller device, that is, at least one remote device, controlled by a host device, comprising:
   a control unit configured to extract a control message from a Protocol Data Unit (PDU) of a downlink transmission frame in which Protocol Control Information (PCI) including at least one of unicast information, multicast information and broadcast information having an ID of a specific remote device has been combined with the PDU, to generate control signals capable of driving sensors or drive elements in response to the extracted control message, to internally generate an uplink transmission frame by combining PCI, including unicast information corresponding to an ID of the host device, with a PDU based on state information related to an operating state of the sensors or the drive elements, and to output the generated uplink transmission frame;
   a first optical transmission/reception unit configured to externally send or receive the uplink or downlink transmission frame;
   a second optical transmission/reception unit configured to comprise at least one port and externally send or receive the uplink or downlink transmission frame; and
   a switching unit configured to output the downlink transmission frame to the second optical transmission/reception unit or transfer the downlink transmission frame to the control unit depending on whether or not PCI of the downlink transmission frame received from the first optical transmission/reception unit corresponds to the ID of the industrial controller device, to transfer the uplink transmission frame externally received from the second optical transmission/reception unit to the first optical transmission/reception unit, to transfer the uplink transmission frame received from the control unit to the first optical transmission/reception unit, and to transfer the downlink transmission frame received from the control unit to the second optical transmission/reception unit.

6. The industrial controller device of claim 5, wherein:
   the switching unit comprises first and second switches;
   the first switch transfers the received downlink transmission frame to the control unit if the PCI of the downlink transmission frame includes unicast information corresponding to the ID of the industrial controller device, outputs the received downlink transmission frame to the second switch if the PCI of the downlink transmission frame includes unicast information not corresponding to the ID of the industrial controller device, and transfers the downlink transmission frame to the control unit and also outputs the downlink transmission frame to the second switch if the PCI of the downlink transmission frame includes multicast/broadcast information corresponding to the ID of the industrial controller device; and
   the second switch transfers the uplink transmission frame received from the control unit to the first optical transmission/reception unit and transfers the downlink transmission frame received from the control unit to the second optical transmission/reception unit.

7. The industrial controller device of claim 5, wherein the uplink or downlink transmission frame is formatted by adding, inserting, or partially overwriting the PCI into the PDU.

8. An industrial controller device, that is, at least one remote device, controlled by a host device, comprising:

a first optical transmission/reception unit configured to externally receive a downlink transmission frame in which Protocol Control Information (PCI) including at least one of unicast information and multicast/broadcast information having an ID of a specific remote device is combined with a Protocol Data Unit (PDU) and sending an uplink transmission frame;

a second optical transmission/reception unit configured to externally receive an uplink transmission frame, and to send a downlink transmission frame;

a control unit configured to extract a control message from the PDU within the downlink transmission frame received from the first optical transmission/reception unit, to generate control signals capable of driving sensors or drive elements in response to the extracted control message, and to internally generate an uplink transmission frame by combining PCI, including unicast information corresponding to an ID of the host device, with a PDU according to state information related to an operating state of the sensors or the drive elements; and a switching unit configured to transfer the downlink transmission frame to at least one of the control unit and the second optical transmission/reception unit depending on whether or not the PCI of the received downlink transmission frame corresponds to an ID of the industrial controller device, and to sequentially transfer the uplink transmission frames received from the second optical transmission/reception unit and the control unit to the first optical transmission/reception unit.

9. The industrial controller device of claim 8, wherein:
the switching unit comprises first and second switches;
the first switch transfers the received downlink transmission frame to the control unit if the PCI of the downlink transmission frame includes unicast information corresponding to the ID of the industrial controller device, outputs the received downlink transmission frame to the second optical transmission/reception unit if the PCI of the downlink transmission frame includes unicast information not corresponding to the ID of the industrial controller device, and transfers the downlink transmission frame to the control unit and also outputs the downlink transmission frame to the second optical transmission/reception unit if the PCI of the downlink transmission frame includes multicast/broadcast information corresponding to the ID of the industrial controller device; and the second switch sequentially transfers the uplink transmission frame received from the second optical transmission/reception unit and the control unit to the first optical transmission/reception unit.

10. The industrial controller device of claim 8, wherein the uplink or downlink transmission frame is formatted by adding, inserting, or partially overwriting the PCI into the PDU.

11. A method of driving an industrial controller device, that is, at least one remote device, controlled by a host device, the method comprising:

externally receiving a downlink transmission frame generated by combining Protocol Control Information (PCI), including at least one of unicast information, multicast information and broadcast information having an ID of a specific remote device, with a PDU;

analyzing whether or not the PCI of the received downlink transmission frame corresponds to the industrial controller device;

resending the downlink transmission frame downward or capturing the downlink transmission frame in order to parse the PDU depending on whether or not the PCI corresponds to the industrial controller device;

extracting the PDU by parsing the downlink transmission frame;

extracting a control message from the extracted PDU, and generating control signals capable of driving sensors or drive elements in response to the control message;

generating an uplink transmission frame by combining PCI, including unicast information corresponding to an ID of the host device, with a PDU including state information related to an operating state of the sensors or the drive elements; and sending the generated uplink transmission frame or an externally received uplink transmission frame upward.

12. The method of claim 11, wherein resending the downlink transmission frame downward or capturing the downlink transmission frame in order to parse the PDU depending on whether or not the PCI corresponds to the industrial controller device comprises:

capturing the received downlink transmission frame in order to parse the PDU if the PCI comprises unicast information corresponding to an ID of the industrial controller device;

resending the received downlink transmission frame in an original transfer direction downward if the PCI comprises unicast information not corresponding to the ID of the industrial controller device; and capturing the received downlink transmission frame in order to parse the PDU and also resending the received downlink transmission frame downward if the PCI includes multicast or broadcast information corresponding to the ID of the industrial controller device.

13. The method of claim 11, wherein the uplink or downlink transmission frame is formatted by adding, inserting, or partially overwriting the PCI into the PDU.

* * * * *